Patented Feb. 7, 1939

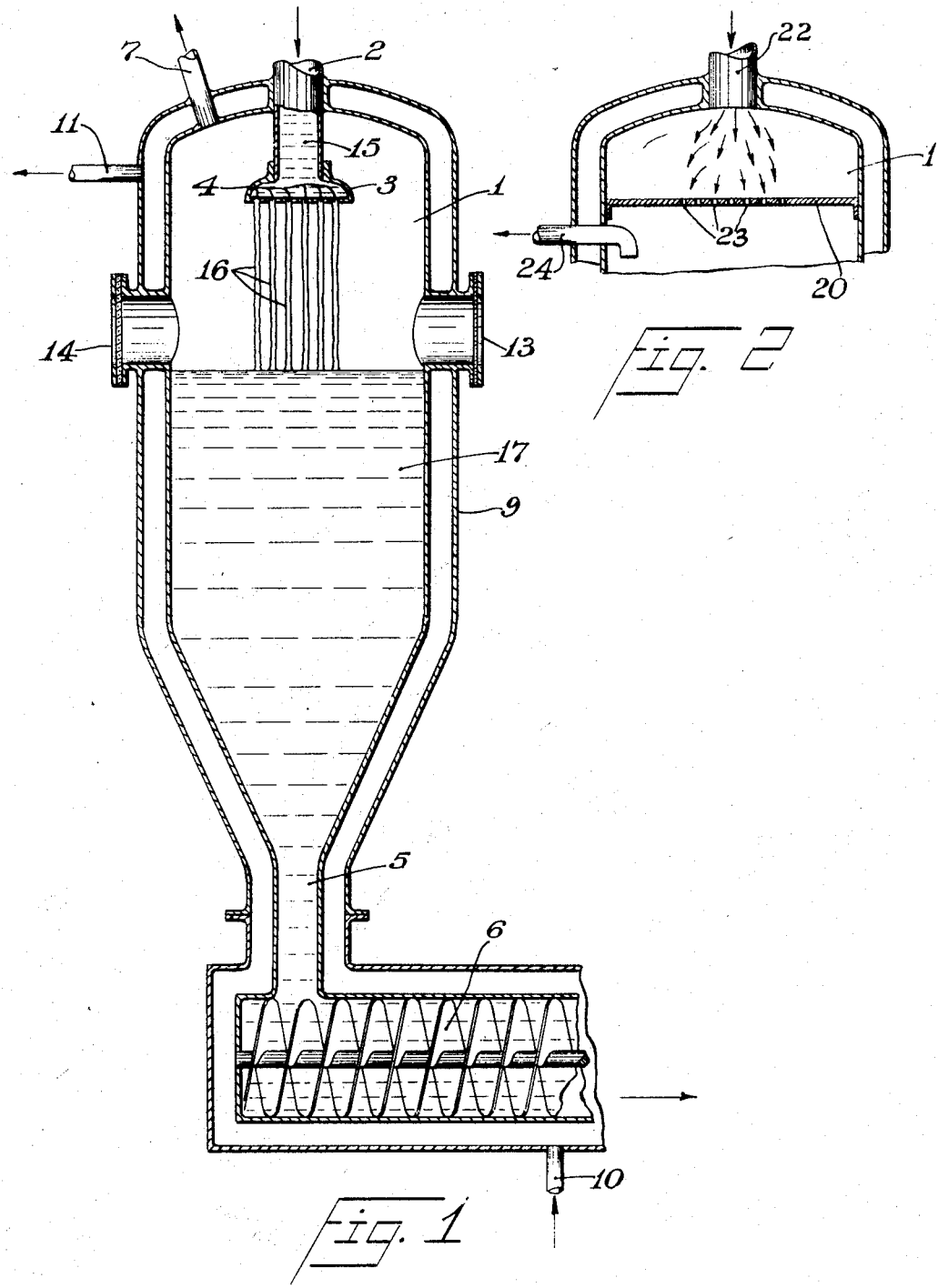

2,146,532

UNITED STATES PATENT OFFICE 2,146,532

EXTRUSION PROCESS

Paul W. Crane, Upper Montclair, and Reuben T. Fields, Arlington, N. J., assignors, by mesne assignments, to E. I. du Pont de Nemours & Company, Wilmington, Del., a corporation of Delaware Application March 13, 1936, Serial No. 68,608

4 Claims. (Cl. 18—48)

This invention relates to an extrusion process and, more particularly, relates to the removal of dissolved and entrapped air from organic plastic dough in the continuous extrusion manufacture of sheeting, rods, tubes, and the like.

The invention relates to the extrusion of doughs of cellulose derivative plastics, polyvinyl resins, and other organic plastics as compared to relatively liquid dopes commonly used in film casting, and the like. In general, the doughs suitable for use in the present invention have a consistency which may vary between that of a dough made by mixing together (by weight) pyroxylin of 800 centipoises, (measured at 25° C. in a solution of 6% pyroxylin, 28.2% camphor, 65.7% of 95% ethyl alcohol by the falling sphere method, J. Ind. Eng. Chem., vol. 14, page 1164) 24%; camphor 8%, 95% ethyl alcohol 68%, as a low limit of consistency, and the consistency of a dough made by mixing together (by weight) pyroxylin of 800 centipoises (measured as above) 56%; camphor 19%, ethyl alcohol 25%, as a high limit of consistency. (It will be understood that these consistencies are standards for plastics in general, and not confined to use in determining the comparative consistency of only pyroxylin plastic.) These consistency limits are those of the given plastic compositions at 52° C.

In the extrusion of these organic plastic doughs, difficulty is encountered in the form of bubbles in the extruded product as a result of air entrapped or dissolved in the dough. Ordinarily in these extrusion processes, as for example, the process disclosed in Crane and Fields U. S. Patent 1,956,564, Method of producing plastic sheeting, the procedure is to filter the plastic to remove foreign matter and then deliver it to the extrusion jaws and, in this filtering, the formation of bubbles in the plastic is quite prevalent. Also, is is frequently desirable to reduce the volatile solvent content of the dough after it is filtered but before it is extruded and to do this in some feasible manner in a continuous process has presented a difficult problem.

An object of the present invention is to provide an economical and feasible method of deaerating a dough of organic plastic of a consistency such as indicated above and delivering it in such condition to the extrusion orifice in a continuous extrusion process. A further object is to provide such a method whereby solvent content of the dough may be reduced subsequent to filtration but prior to extrusion, as well as deaerating the dough. A further object is to provide a simplified apparatus to carry out the method of the present invention.

The above objects are accomplished according to the present invention by employing, in the process of continuously extruding a dough of organic plastic, the steps comprising forming the dough into strands, subjecting said strands to reduced pressure to deaerate same, and to remove the volatile solvent if desired, coalescing said strands into a substantially voidless mass of plastic while still subjected to reduced pressure, and then conveying the plastic through a closed system to the extrusion orifice.

In the preferred form, the invention is carried out in an apparatus comprising a vacuum chamber having an intake pipe at the upper end thereof for the dough delivered from the filter or elsewhere, a perforated plate mounted in the chamber and connecting with the pipe, through which plate the dough is forced to form it into strands, a discharge outlet at the lower end of said chamber through which the coalesced strands can be withdrawn, and a pump, a screw conveyor, or the like, connected with said outlet to convey the plastic to the extrusion orifice.

In the accompanying drawing:

Fig. 1 illustrates, more or less diagrammatically, a vertical section through one form of apparatus embodying the present invention;

Fig. 2 is a similar view of the upper portion of a modified form of apparatus.

Referring to Fig. 1, reference numeral 1 indicates a vacuum chamber having an intake pipe 2 for the dough. The pipe 2 is capped with a distributing head or plate 3 in the face of which are the perforations 4. The chamber 1 is also provided with discharge outlet 5 arranged to feed directly into the closed screw conveyor 6 which is adapted to transfer the dough, either directly or indirectly, to the extrusion orifice through which the dough is to be extruded.

The chamber 1 is connected through the pipe 7 to a suitable vacuum pump either with a solvent recovery unit interposed in the line, or not, as desired, and the whole piece of apparatus is surrounded by the heating jacket 9 having inlet 10 and outlet 11 for water. Sight glasses 13 and 14 are provided in the sides of the vacuum chamber 1 in order that the level of the coalesced strands of plastic may be observed.

In Fig. 1 the apparatus is shown diagrammatically as if in operation as follows: A plastic dough 15, issuing from filtering equipment, or the like, is fed by suitable pressure, which may conveniently be the remainder of the pressure with which filtration has been effected, into the vacuum chamber 1 through the intake pipe 2 to the distributing head 3. As shown, the dough issues from the perforations 4 of the distributing head or plate in the form of a corresponding number of strands 16 which pass vertically downward through the space within the vacuum chamber and coalesce at the bottom into a solid plastic mass 17. During the passage of the strands through the vacuum chamber, the vacuum which is maintained therein at all times, effects the removal of dissolved or entrapped air from the strands. The coalesced mass 17 contains no air and any voids initially formed within it, contain only solvent vapor and disappear through condensation of that vapor so that a substantially voidless plastic mass is left.

The mass of dough 17 at the bottom of the vacuum chamber 1 is continuously withdrawn through the discharge pipe 5 by the action of the screw conveyor 6 which forces the dough into a closed container from which it is extruded, and which may also conveniently furnish the pressure for extruding the dough through the jaws of the extrusion orifice. The entire system beyond the vacuum tank, comprising the screw conveyor, the extrusion chamber, and any necessary connections, comprises a closed system so that no air is able to enter the mass after its deaeration until it has been extruded. Because of this arrangement, the dough, as it is extruded, yields extruded rods, sheets, tubes, or the like, which are free from air bubbles and which will not develop air bubbles, as a result of dissolved air, at any subsequent stage of manufacture.

During the passage of the dough through the vacuum chamber, there is also removed, in addition to air, a part of the volatile solvent contained within the dough. This is a second function of the vacuum chamber and, by adjusting conditions, can be made greater or lesser in effect as desired.

The following specific examples are given to illustrate the invention, particularly in connection with the process of extruding sheets of pyroxylin in accordance with the above mentioned United States Patent 1,956,564, Example 1 employing a low vacuum so that practically no volatile solvent is removed, whereas Example 2 employs a higher vacuum, effecting removal of about 5% of the volatile solvent. All parts given throughout the specification and claims are by weight:

*Example 1.*—A dough issuing from the filter and entering the vacuum chamber has the following composition:

| | |
|---|---|
| Pyroxylin | 35 |
| Camphor | 12 |
| Ethyl alcohol | 40 |
| Acetone | 13 |

The temperature of the dough entering the vacuum chamber is 68° C. and the jacket of the vacuum chamber is heated with hot water at 66° C. A vacuum of 5" of mercury is maintained within the chamber which has a height of 8.5 feet and a diameter of 2 feet. The distributing head of the chamber was similar to that shown in Fig. 1 and had a diameter of 12", the diameter of the perforations therein being ⅛" and the perforations being spaced approximately ⅜" between centers.

The pressure on the material entering the chamber is such as to introduce it continuously and uniformly at a rate of 875 pounds per hour and the level of the coalesced dough in the bottom of the chamber is maintained at approximately 5.5 to 6.5 feet above the bottom of the chamber, the strands having, accordingly, a distance of about 3 to 2 feet to travel before they reach this level.

In operating in this manner substantially all of the air is removed from the material and it coalesces to a substantially voidless mass which is continuously withdrawn from the bottom of the vacuum tank by the action of the screw conveyor which passes it to the extrusion equipment.

While the treatment in the vacuum chamber substantially completely deaerates the plastic, the solvent content of the dough is only reduced by about 0.5%.

*Example 2.*—A dough issuing from the filter and entering the vacuum chamber has the following composition:

| | |
|---|---|
| Pyroxylin | 36 |
| Camphor | 12 |
| Ethyl alcohol | 39 |
| Acetone | 13 |

The temperature of the dough entering the vacuum chamber is 71° C. and the jacket of the vacuum chamber is heated with hot water at 68° C. A vacuum of 14" of mercury is maintained within the chamber which has the same dimensions as the chamber used in Example 1.

The pressure on the plastic entering the chamber is such as to introduce it continuously and uniformly at a rate of 620 pounds per hour and the level of the coalesced plastic in the bottom of the chamber is maintained at approximately 5 to 5½ feet above the bottom of the chamber so that the strands have a distance of about 3½ to 3 feet to travel before reaching this level. All air is removed from the plastic and it coalesces to a substantially voidless mass which is continuously withdrawn from the bottom of the vacuum chamber by the action of the screw conveyor which passes it to the extrusion equipment.

The treatment of the plastic in the vacuum chamber reduces the solvent content of the material by about 5%.

The above examples are merely illustrative and it will be understood that conditions can be widely varied without departing from the present invention.

The apparatus illustrated in Fig. 1 may be modified as shown in Fig. 2 wherein a perforated plate 20 is attached to the sides of the vacuum chamber 1 and an intake pipe 22 opens directly into the chamber, rather than employing the combination of intake pipe 2 and distributing head or plate 3, as in Fig. 1. In Fig. 2, the perforations 23 are positioned well away from the sides of the vacuum chamber in order that the strands of plastic may not contact the sides of the chamber or the pipe 24 connecting to a vacuum pump.

Obviously, the perforations in the plate 3 (Fig. 1) or plate 20 (Fig. 2) may be of any shape although a circular perforation is preferred; one or more slit-like perforations may be used, thereby causing the strands to form in thin sheets or ribbons. In fact, the shape of the perforation is immaterial as long as the dough is formed into strands or elongated bodies characterized by a large surface compared to volume, so that deaeration is facilitated. It has been found that circular perforations having a diameter of $\frac{1}{32}$" to 1" about represents the range which can be used practically, while a preferred range of diameter is $\frac{1}{16}$" to ¼". It will be understood that this preferred range represents a balance between a maximum perforation above which the escape of air through the strand formed is too slow for practical purposes and a minimum perforation below which no appreciable gain in rate of removal of air from the strands of plastic is attained. Where removal of solvent is desirable, the apparatus should be designed to form strands in which the ratio of surface to volume is especially large, as removal of solvent is more sensitive to this ratio than is the removal of air.

The particular shape and size of the vacuum chamber may be widely varied without departing from the spirit of the invention. The cone-shaped bottom of the vacuum chamber (see Fig. 1) is desirable as it facilitates the passage of plastic through the equipment without formation of dead spots but this particular design is by no means essential. In place of the screw conveyor shown in Fig. 1, other means of removing the plastic from the discharge outlet may be used. Ordinarily in extrusion apparatus, a positive displacement pump is provided to supply the plastic under pressure to the extrusion orifice and any suitable type of pump or conveyor to feed the plastic to the positive displacement pump may be connected to the discharge outlet of the vacuum chamber. For example, in place of the screw conveyor, a pair of rolls operating in a casing forming a continuation of the bottom part of the vacuum chamber may be used, said rolls being driven in opposite direction so as to effect withdrawal of the plastic from the vacuum chamber. It will be understood that the plastic may be supplied directly to the extrusion orifice by the screw conveyor, or the like, without use of a positive displacement pump, if desired.

The particular type of vacuum pump employed and extrusion apparatus employed forms no part of the present invention and any pump or extrusion apparatus known to the art may be employed.

It will be obvious to those skilled in the art that there are several factors which contribute to control of the air removal from the plastic dough and the volatile solvent removed therefrom; these factors include the dimensions of the vacuum chamber and the free space in it, the rate at which the dough is fed into the vacuum chamber, solvent content of the dough and properties of the solvent, temperature of the dough, viscosity of the dough (which is in part dependent on temperature), size of the strands of plastic formed, and magnitude of the vacuum maintained. In any particular instance, the correlation of these various factors to give the optimum result desired will necessitate a certain amount of adjusting and trial which are well within the skill of workers in this art.

In general, it has been found that a vacuum of as little as 2" of mercury will, in some cases, effect deaeration, particularly with a relatively low viscosity plastic. On the other hand, a substantially complete vacuum of 29-30" of mercury may be used where removal of considerable volatile solvent is desired. In practice, a vacuum of 5—15" of mercury is preferred and a vacuum of 20" will seldom be exceeded, both because of the cost of maintaining such a vacuum and because it will result in undesirably violent evaporation of solvent from doughs such as are usually handled.

The temperature of the dough when subjected to the reduced pressure will primarily be determined by the temperature at which the plastic is to be filtered and extruded providing, of course, that the consistency of the plastic be within, or close to, the consistency range set forth at the beginning of the specification. With respect to the present invention, the temperature of the plastic is only material in so far as it affects the consistency of the plastic dough and the removal of the volatile solvent; deaeration can take place effectively at low temperature if the consistency of the dough at such temperature is approximately within the range specified. As a matter of efficiency, it is expedient to carry out the deaeration at the temperature at which the dough is filtered and extruded, or the approximate mean between said temperatures if they are different; this will usually result in deaeration being carried out at somewhat elevated temperatures as disclosed in the examples.

It will be apparent that the present invention is dependent on the consistency of the plastic dough rather than its specific composition, that is, the invention is equally applicable to any plastic dough used in extrusion processes, whether a cellulose derivative plastic, a cellulose nitrate or acetate, or a vinyl resin plastic, or other type of resin plastic. Since cellulose derivative plastics are chiefly used in the extrusion of rods, sheets, and tubes at the present time, the invention has been particularly described with respect to such plastics.

While the main function of the process of the present invention is the deaeration of the dough, it will be obvious that control of the volatile solvent content removed, if any, may be exercised by variation of several factors. Removal of solvent is promoted by a high vacuum, high temperature, and large surface compared to volume of the strands formed, i. e., a small diameter, and by a lengthy drop in the vacuum chamber which means a prolonged exposure to the vacuum. Also, the rate of removal of solvent is a function of the particular solvent employed as some are appreciably more volatile than others.

The deaeration of the dough will generally be completed within a short distance from the point of formation of the strands at the distributing head or perforated plate, even under a low vacuum, unless the dough be of particularly high viscosity. Where it is desired to remove only a minimum of solvent, the distance of fall of the strands before they coalesce may be limited to this short distance and this is advantageous in allowing the mass of coalesced strands in the bottom of the vacuum tank to be maintained at a level several feet above the discharge outlet of the chamber. By maintaining the mass of coalesced strands at a level somewhat above the discharge outlet of the chamber, there is provided a hydrostatic head to facilitate discharge of the plastic from the bottom of the chamber to the screw conveyor or other type of pump by which the plastic is moved to the extrusion apparatus. Also, this mass of coalesced strands forms a convenient reserve of plastic which may be called upon to maintain a proper balance between the intake and discharge of plastic through the vacuum chamber. For example, in the event of a temporary interruption of the intake of plastic during a switch from one to another of filters in parallel, the reserve of plastic in the vacuum chamber will permit the uninterrupted continuation of the extrusion.

To carry out the present invention all elements of the apparatus subsequent to discharge of the dough into the vacuum chamber should constitute a closed system to prevent the entrapment of air. It is for this reason that the step of deaeration should follow rather than precede the step of filtration, if any, since the filtering press, although a closed system during continuous operation, must actually in practice, be opened occasionally for the changing of cloths. This opening of filtering presses is, in fact, one of the principal sources of the air which the present invention removes from the dough.

The present invention is useful in the continuous processes of extruding plastic rods, sheets, tubes, and the like. An advantage of the invention is that it provides a simple, inexpensive, and easily operated method for removing the entrapped and dissolved air from plastic doughs prior to their extrusion and thereby eliminates the risk of development of bubbles as a result of contained air in the extruded products. In addition, the present invention provides means of reducing and controlling the solvent content of the dough. Furthermore, the present invention is adapted to facilitate the smooth operation of a continuous extrusion process employing plastic dough which necessarily is prepared in successive separate batches, and enables the dough to be delivered to the extrusion orifice free from air and uncontaminated by dirt.

As many apparently widely different embodiments of this invention may be made without departing from the spirit and scope thereof, it is to be understood that the invention is not limited to the specific embodiments thereof except as defined in the appended claims.

We claim:

1. In the process of continuously extruding a dough of organic plastic having a consistency, measured at 52° C., between that of a dough made by mixing together pyroxylin of 800 centipoises, 24%, camphor 8%, 95% ethyl alcohol 68%, and a dough made by mixing together pyroxylin of 800 centipoises, 56%, camphor 19%, 95% ethyl alcohol 25%, through an extrusion orifice, the steps comprising forming the dough into strands, allowing said strands to fall freely while subjected to reduced pressure to deaerate same, allowing said strands to coalesce of their own weight into a substantially voidless mass of plastic while still subjected to reduced pressure, and thereafter conveying said plastic through a closed system to the extrusion orifice.

2. In the process of continuously extruding a dough of a cellulose derivative plastic having a consistency, measured at 52° C., between that of a dough made by mixing together pyroxylin of 800 centipoises, 24%, camphor 8%, 95% ethyl alcohol 68%, and a dough made by mixing together pyroxylin of 800 centipoises, 56%, camphor 19%, 95% ethyl alcohol 25%, through an extrusion orifice, the steps comprising forming the dough into strands, allowing said strands to fall freely while subjected to reduced pressure to deaerate same, allowing said strands to coalesce of their own weight into a substantially voidless mass of plastic while still subjected to reduced pressure, and thereafter conveying said plastic through a closed system to the extrusion orifice.

3. In the process of continuously extruding a dough of a cellulose derivative plastic having a consistency, measured at 52° C., between that of a dough made by mixing together pyroxylin of 800 centipoises, 24%, camphor 8%, 95% ethyl alcohol 68%, and a dough made by mixing together pyroxylin of 800 centipoises, 56%, camphor 19%, 95% ethyl alcohol 25%, through an extrusion orifice, the steps comprising forming the dough into strands, allowing said strands to fall freely while subjected to a vacuum of 5–15" of mercury to deaerate same, allowing said strands to coalesce of their own weight into a substantially voidless mass of plastic while still subjected to reduced pressure, and thereafter conveying said plastic through a closed system to the extrusion orifice.

4. In the process of continuously extruding a dough of a cellulose derivative plastic having a consistency, measured at 52° C., between that of a dough made by mixing together pyroxylin of 800 centipoises, 24%, camphor 8%, 95% ethyl alcohol 68%, and a dough made by mixing together pyroxylin of 800 centipoises, 56%, camphor 19%, 95% ethyl alcohol 25%, through an extrusion orifice, the steps comprising forming the dough into strands of circular cross section having a diameter of $\frac{1}{16}$" to $\frac{1}{4}$", allowing said strands to fall freely while subjected to a vacuum of 5–15" of mercury to deaerate same, allowing said strands to coalesce of their own weight into a substantially voidless mass of plastic while still subjected to reduced pressure, and thereafter conveying said plastic through a closed system to the extrusion orifice.

PAUL W. CRANE.
REUBEN T. FIELDS.